US010084173B2

(12) United States Patent
Ha (10) Patent No.: US 10,084,173 B2
(45) Date of Patent: Sep. 25, 2018

(54) BATTERY PACK (71) Applicant: SAMSUNG SDI CO., LTD., Yongin-si, Gyeonggi-do (KR)

(72) Inventor: Seonjun Ha, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 0 days.

(21) Appl. No.: 15/002,424

(22) Filed: Jan. 21, 2016

(65) Prior Publication Data

US 2016/0248068 A1 Aug. 25, 2016

(30) Foreign Application Priority Data

Feb. 25, 2015 (KR) .................. 10-2015-0026748

(51) Int. Cl.
*H01M 2/20* (2006.01)
*H01M 2/10* (2006.01)
*H01M 2/06* (2006.01)

(52) U.S. Cl.
CPC ............ *H01M 2/202* (2013.01); *H01M 2/06* (2013.01); *H01M 2/1016* (2013.01); *H01M 2/1061* (2013.01); *H01M 2/1077* (2013.01); *H01M 2220/20* (2013.01); *H01M 2220/30* (2013.01)

(58) Field of Classification Search
None
See application file for complete search history.

(56) References Cited

U.S. PATENT DOCUMENTS

| 8,197,960 | B2 | 6/2012 | Kosugi et al. | |
|---|---|---|---|---|
| 2003/0064285 | A1* | 4/2003 | Kawamura | H01M 2/0469 429/181 |
| 2007/0048603 | A1 | 3/2007 | Cherng et al. | |
| 2007/0141457 | A1 | 6/2007 | Amagai | |
| 2008/0124617 | A1 | 5/2008 | Bjork | |
| 2010/0052692 | A1 | 3/2010 | Yano et al. | |
| 2010/0124693 | A1 | 5/2010 | Kosugi et al. | |
| 2010/0310909 | A1 | 12/2010 | Yun et al. | |
| 2010/0323235 | A1 | 12/2010 | Takami et al. | |
| 2011/0039131 | A1 | 2/2011 | Moon | |
| 2011/0200866 | A1 | 8/2011 | Yun et al. | |
| 2012/0282516 | A1 | 11/2012 | Kim | |
| 2012/0295150 | A1* | 11/2012 | Gao | H01M 2/021 429/158 |

(Continued)

FOREIGN PATENT DOCUMENTS

CN 102 055 002 A 5/2011
JP 2007-265945 A 10/2007

(Continued)

OTHER PUBLICATIONS

Extended European Search Report dated Jul. 7, 2016 for corresponding EP Application No. 16157335.

(Continued)

*Primary Examiner* — Wojciech Haske
(74) *Attorney, Agent, or Firm* — Lee & Morse, P.C.

(57) ABSTRACT

A battery pack, including a battery cell including an electrode tab; a cell holder through which the electrode tab is inserted; and a connection tab including a first connection tab portion and a second connection tab portion facing each other and coupled to the electrode tab with the electrode tab being therebetween.

10 Claims, 10 Drawing Sheets

(56) References Cited

U.S. PATENT DOCUMENTS

| | | | |
|---|---|---|---|
| 2012/0328908 A1 | 12/2012 | Han et al. | |
| 2015/0037662 A1* | 2/2015 | Pinon | H01M 2/0237 429/179 |

FOREIGN PATENT DOCUMENTS

| | | | |
|---|---|---|---|
| JP | 2010-009225 A | 1/2010 | |
| JP | 2010-123299 A | 6/2010 | |
| JP | 2011-233319 | 11/2011 | |
| JP | 2013-092840 A | 5/2013 | |
| JP | 2014-053104 A | 3/2014 | |
| KR | 10-2007-0081545 A | 8/2007 | |
| KR | 10-2009-0030202 A | 3/2009 | |
| KR | 10-2010-0026986 A | 3/2010 | |
| KR | 10-2012-0048259 A | 5/2012 | |
| KR | 10-2012-0123946 A | 11/2012 | |
| KR | 10-2013-0023059 A | 3/2013 | |
| WO | WO 2009/057894 A | 5/2009 | |
| WO | WO 2014011801 A1 * | 1/2014 | H01M 2/1077 |
| WO | WO 2014/024433 A1 | 2/2014 | |

OTHER PUBLICATIONS

Extended European Search Report dated Jul. 16, 2016 for EP Application No. 161573332 which is a family member for co-pending U.S. Appl. No. 15/002,712.

USPTO Office Action dated Aug. 23, 2017, in U.S. Appl. No. 15/002,731.

European Office Action dated Apr. 7, 2017 for EP Application No. 161573332 which is a family member for co-pending U.S. Appl. No. 15/002,712.

USPTO Office Action dated Feb. 20, 2018, in U.S. Appl. No. 15/002,737.

USPTO Office Action dated Apr. 27, 2018, in U.S. Appl. No. 15/002,422.

USPTO Office Action dated Jan. 17, 2018, in U.S. Appl. No. 15/002,712.

USPTO Office Action dated Jun. 15, 2018, in U.S. Appl. No. 15/002,737.

* cited by examiner

BATTERY PACK

CROSS-REFERENCE TO RELATED APPLICATION

Korean Patent Application No. 10-2015-0026748, filed on Feb. 25, 2015, in the Korean Intellectual Property Office, and entitled: "Battery Pack," is incorporated by reference herein in its entirety.

BACKGROUND

1. Field

One or more exemplary embodiments relate to a battery pack.

2. Description of the Related Art

Unlike primary batteries, secondary batteries may be rechargeable. Secondary batteries may be used as energy sources of devices such as mobile devices, electric vehicles, hybrid electric vehicles, electric bicycles, and uninterruptible power supplies. Single-cell secondary batteries or multi-cell secondary batteries (secondary battery packs) in which a plurality of battery cells are electrically connected may be used according to the types of external devices using the secondary batteries.

SUMMARY

Embodiments may be realized by providing a battery pack, including a battery cell including an electrode tab; a cell holder through which the electrode tab may be inserted; and a connection tab including a first connection tab portion and a second connection tab portion facing each other and coupled to the electrode tab with the electrode tab being therebetween.

The electrode tab and the connection tab may be coupled together by welding.

The battery pack may include a plurality of battery cells, and the connection tab may be coupled to electrode tabs of a first battery cell and a second battery cell neighboring each other in an arrangement direction of the battery cells.

The electrode tabs of the first and second battery cells may be between the first and second connection tab portions and may not overlap each other.

A cross-section of a coupling portion between the electrode tabs and the connection tab may have a maximum of three layers including the first and second connection tab portions and the electrode tab of the first or second battery cell.

The connection tab may include a material different from a material included in the electrode tab of at least one of the first and second battery cells.

The electrode tabs of the first and second battery cells may include different materials.

The first and second connection tab portions may include a same material.

The first connection tab portion may include a tab hole, the electrode tab may extend through the tab hole, and the second connection tab portion may cover a portion of the electrode tab which may be exposed through the tab hole.

The electrode tab extending through the tab hole may be bent in a direction parallel to the first and second connection tab portions and may be in surface contact with the first and second connection tab portions.

The first connection tab portion may include first and second tab holes through which the electrode tabs of the first and second battery cells may extend, and the electrode tabs of the first and second battery cells may be bent to face each other and may be in surface contact with the first and second connection tab portions.

The first connection tab portion may include first and second tab holes through which the electrode tabs of the first and second battery cells may extend, and a distance between the first tab hole and a side of the first connection tab portion may be equal to a distance between the second tab hole and the side of the first connection tab portion.

The side of the first connection tab portion may extend in a direction parallel to the arrangement direction of the battery cells.

The first connection tab portion may include first and second tab holes through which the electrode tabs of the first and second battery cells may extend, and a distance between the first tab hole and a side of the first connection tab portion may be different from a distance between the second tab hole and the side of the first connection tab portion.

The first connection tab portion may include first to fourth tab holes through which electrode tabs of first to fourth battery cells may extend, and a distance between the first tab hole and a side of the first connection tab portion may be equal to a distance between the second tab hole and the side of the first connection tab portion, a distance between the third tab hole and the side of the first connection tab portion may be equal to a distance between the fourth tab hole and the side of the first connection tab portion, and the distance between the first tab hole and the side of the first connection tab portion may be different from the distance between the third tab hole and the side of the first connection tab portion.

BRIEF DESCRIPTION OF THE DRAWINGS

Features will become apparent to those of skill in the art by describing in detail exemplary embodiments with reference to the attached drawings in which:

FIG. 9 illustrates an exploded perspective view of the battery pack depicted in

FIG. 8; and

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of features may be exaggerated for clarity of illustration. Like reference numerals refer to like elements throughout.

As used herein, the term "and/or" includes any and all combinations of one or more of the associated listed items. Expressions such as "at least one of," when preceding a list of elements, modify the entire list of elements and do not modify the individual elements of the list.

Battery packs will now be described in detail with reference to the accompanying drawings, in which exemplary embodiments are shown.

Figure 1:
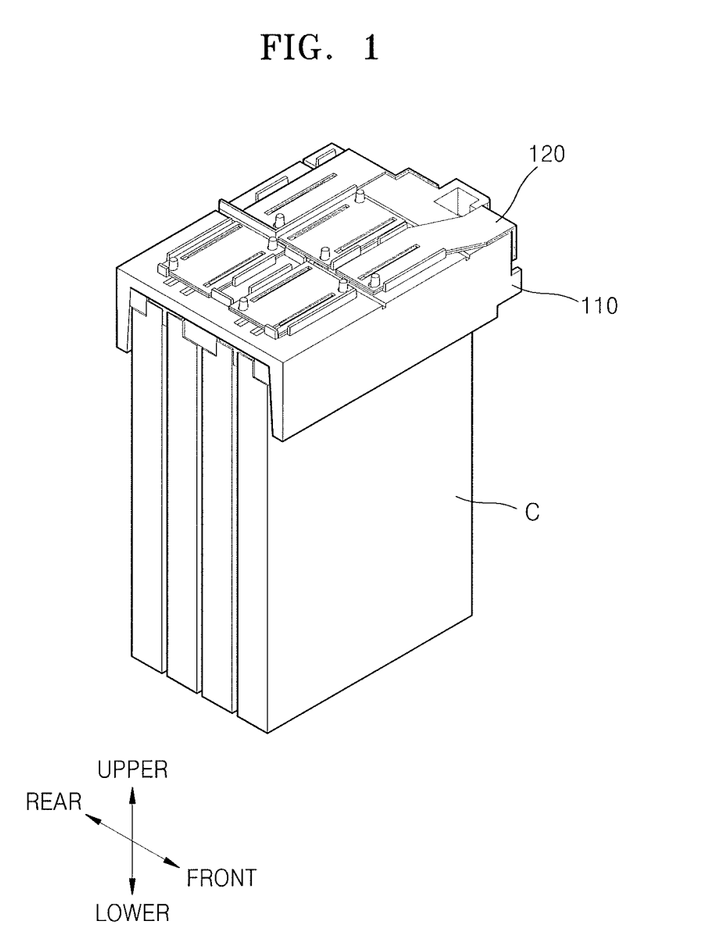
FIG. 1 illustrates a view of a battery pack according to an exemplary embodiment.
Figure 2:
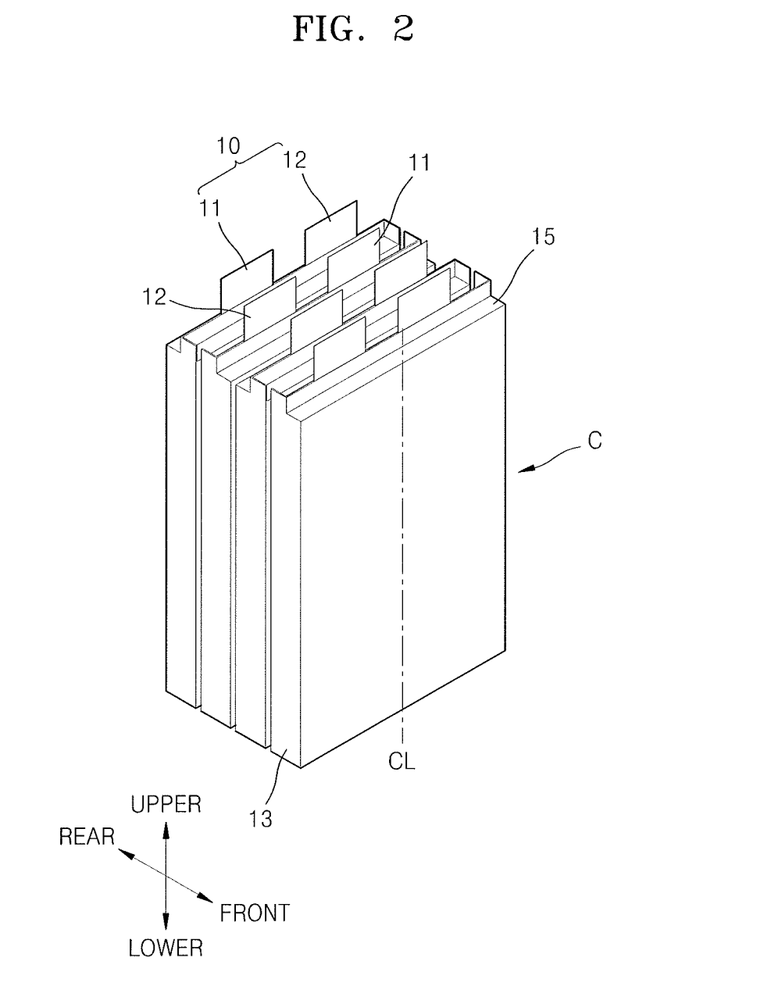
FIG. 2 illustrates a perspective view of battery cells depicted in FIG. 1.
Figure 3:
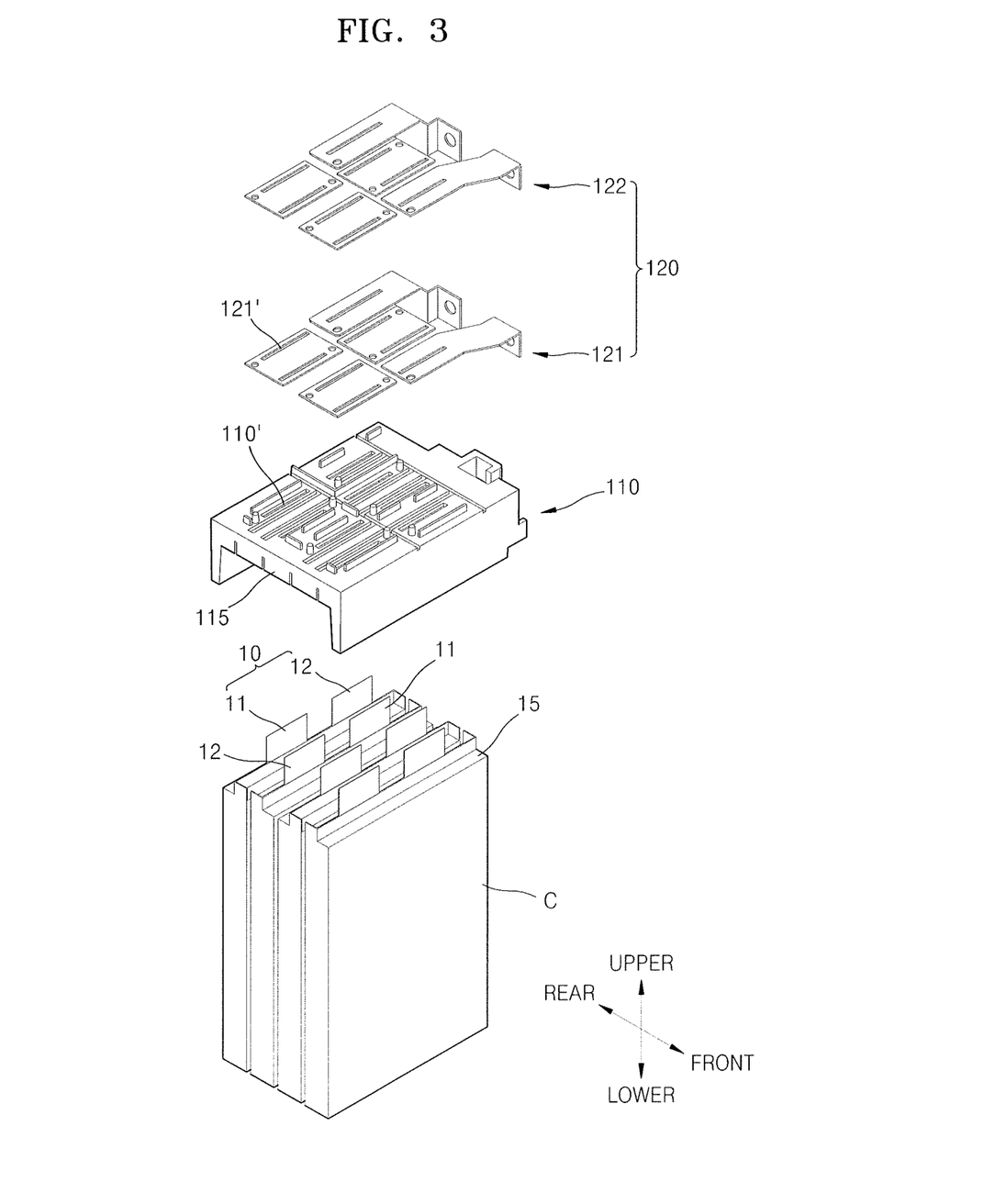
FIG. 3 illustrates an exploded perspective view of the battery pack depicted in FIG. 1.

FIG. 1 illustrates a view of a battery pack according to an exemplary embodiment. FIG. 2 illustrates a perspective view battery cells depicted in FIG. 1. FIG. 3 illustrates an exploded perspective view of the battery pack depicted in FIG. 1.

Referring to FIG. 1, the battery pack may include at least two battery cells C and a cell holder 110 to which the battery cells C may be coupled. The battery cells C may include lithium-ion battery cells. Each of the battery cells C may include an electrode assembly having a stacked structure formed by first and second electrode plates having different polarities and a separator disposed between the first and second electrode plates. A plurality of first and second electrode plates and a plurality of separators may be stacked in the electrode assembly to increase the output power and capacity of the battery cell C.

Referring to FIG. 2, the battery cells C may include cases 13 to seal the electrode assemblies. The battery cells C may be pouch type battery cells including relatively flexible cases 13 instead of metal cans. Each of the battery cells C may include electrode tabs 10 electrically connected to the electrode assemblies and extending outward from the cases 13. Each of the battery cells C may include first and second electrode tabs 11 and 12 respectively making electrical connection with the first and second electrode plates, and having different polarities. In this specification, the term "electrode tab(s) 10" refers to one or both of the first and second electrode tabs 11 and 12. The battery cells C may include terraces 15 from which the electrode tabs 10 extend outward.

Referring to FIG. 3, the battery cells C may be coupled to the cell holder 110. The battery cells C may be coupled to the cell holder 110 in such a manner that the electrode tabs 10 of the battery cells C are exposed on an upper surface of the cell holder 110. The cell holder 110 may support and hold the battery cells C, and the battery cells C may be maintained at proper positions when inserted into the cell holder 110. The cell holder 110 may structurally combine the battery cells C as a single module.

The cell holder 110 may include a plurality of tab holes 110' corresponding to the battery cells C. The electrode tabs 10 extending from the battery cells C may be inserted through the tab holes 110' and exposed to the outside. The tab holes 110' may be paired such that the first and second electrode tabs 11 and 12 extending from each of the battery cells C may be inserted through a pair of the tab holes 110'. For example, the first and second electrode tabs 11 and 12 extending from one of the battery cells C may be inserted through a pair of the tab holes 110', and then the first and second electrode tabs 11 and 12 may be bent forward and backward in opposite directions to make electrical connection with neighboring battery cells C disposed in front and rear directions.

Battery cells C neighboring each other in a front-to-rear direction may be electrically connected to each other through connection tabs 120 superposed on the first and second electrode tabs 11 and 12 of the battery cells. Battery cells C arranged in the front-to-rear direction may be structurally modularized by the cell holder 110 and then may be electrically modularized by the connection tabs 120.

The connection tabs 120 may be superposed on the electrode tabs 10 which extend from the cell holder 110 through the tab holes 110'. Then, the connection tabs 120 may be coupled to the electrode tabs 10, for example, by welding.

The connection tabs 120 may include a pair of first and second connection tabs 121 and 122, e.g., first and second connection tab portions 121 and 122, and each pair of first and second connection tabs 121 and 122 may be disposed on lower and upper sides of the electrode tabs 10 to place the electrode tabs 10 therebetween. As described above, the electrode tabs 10 may be sandwiched between the first and second connection tabs 121 and 122 of the connection tabs 120 disposed on the lower and upper sides of the electrode tabs 10, and electric connection between the electrode tabs 10 and the connection tabs 120 may be made more smoothly. The electric contact area between the connection tabs 120 and the electrode tabs 10 may be increased, and moreover, the coupling strength between the connection tabs 120 and the electrode tabs 10 may be improved.

In an exemplary embodiment, the connection tabs 120 and the electrode tabs 10 may be coupled to each other by welding. In a comparative example, the connection tabs 120 and the electrode tabs 10 may be coupled to each other by soldering. Soldering may be a manual process that may use a large amount of solder, the quality of soldering may not be uniform, and the coupling between the connection tabs 120 and the electrode tabs 10 may be broken at a weak point. Solder may scatter to another conductive part from a coupling portion, and a short circuit may occur. Due to, for example, properties of a material used to form the electrode tabs 10, the electrode tabs 10 may exhibit poor bonding characteristics. For example, the electrode tabs 10 may be formed of an aluminum material, and bonding errors may arise due to, for example, galvanic corrosion. In an exemplary embodiment, welding may be used, process automation may be possible, and coupling quality may be uniformly maintained without electrical connection errors or a short circuit.

The cell holder 110 may include support ribs 115 protruding toward the battery cells C. The support ribs 115 may protrude downward toward the battery cells C. The support ribs 115 may support portions of the battery cells C, for example, the terraces 15 of the battery cells C. For example, the battery cells C may be coupled to the cell holder 110 through a lower side of the cell holder 110, the support ribs 115 may prevent the terraces 15 of the battery cells C from colliding with a lower surface of the cell holder 110 and may maintain a proper distance between the cell holder 110 and the terraces 15 of the battery cells C, and the electrode tabs 10 may be prevented from being damaged during a welding process. The support ribs 115 may protrude from the cell holder 110 toward the terraces 15 of the battery cells C, the coupling height of the battery cells C may be regulated to maintain a proper distance between the cell holder 110 and the battery cells C, and the cell holder 110 may be damaged less by collision, and the electrode tabs 10 may be damaged less during welding.

Figure 4:
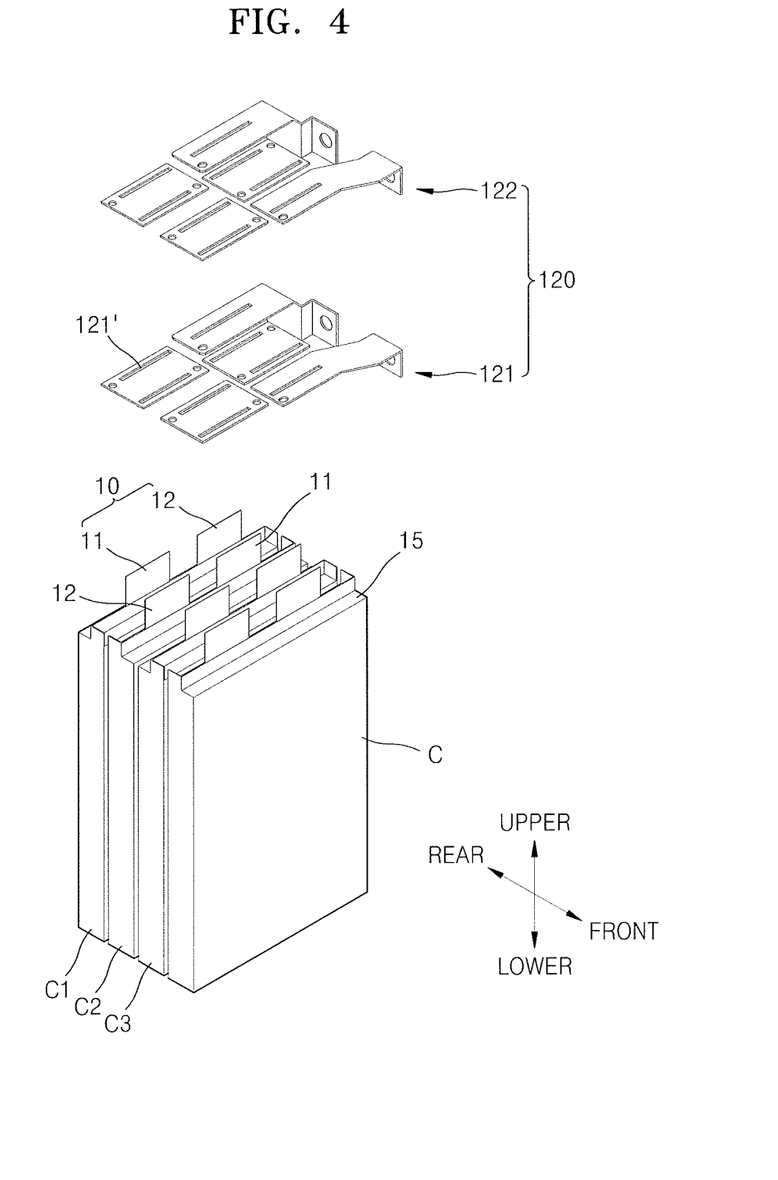
FIGS. 4 and 5 illustrate exploded perspective views of a connection structure of the battery pack.
Figure 5:
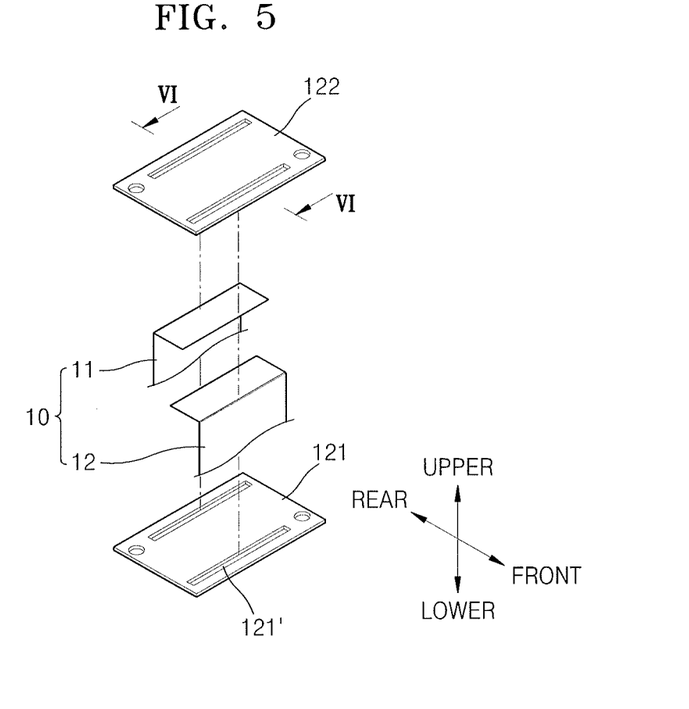
Figure 6:
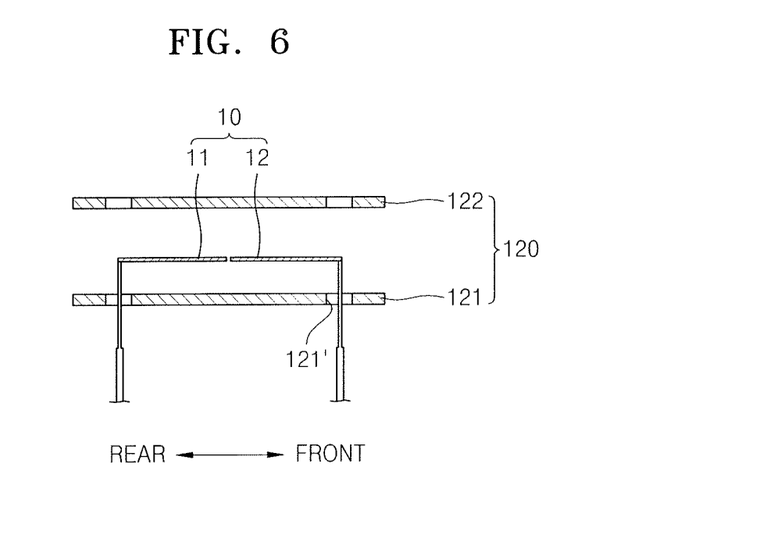
FIG. 6 illustrates a cross-sectional view taken along a cutting line in FIG. 5.
Figure 7:
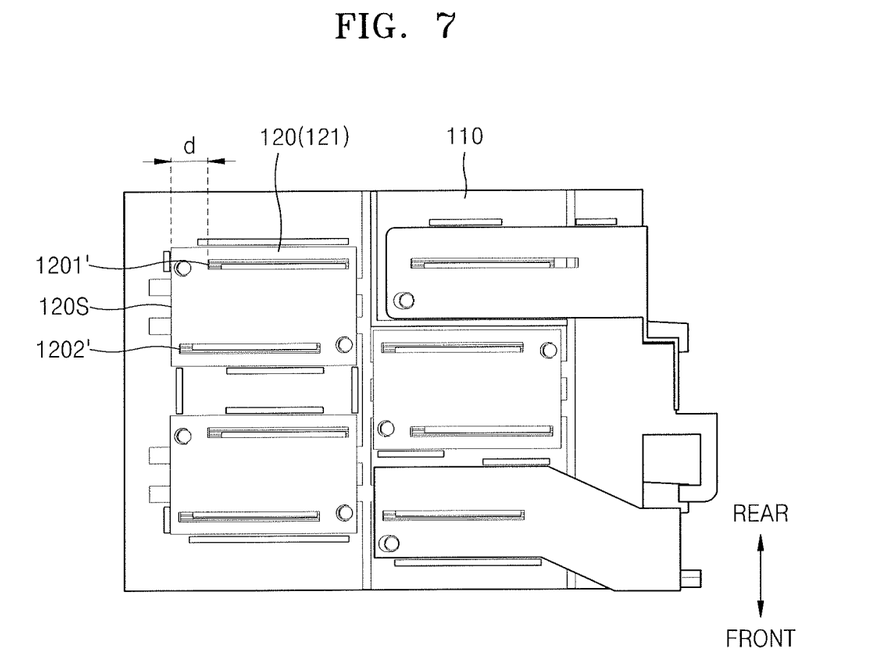
FIG. 7 illustrates a plan view of an upper structure of the battery pack.

FIGS. 4 and 5 illustrate exploded perspective views of a connection structure of the battery pack. FIG. 6 illustrates a cross-sectional view taken along a cutting line in FIG. 5. FIG. 7 illustrates a plan view of an upper structure of the battery pack.

Referring to FIGS. 4 to 6, the first and second connection tabs 121 and 122 may face each other with the electrode tabs 10 therebetween. The first connection tabs 121 may include tab holes 121' so that the electrode tabs 10 may extend through the tab holes 121'. The second connection tabs 122 may cover the electrode tabs 10 exposed through the tab holes 121'. For example, the electrode tabs 10 extending from the battery cells C may be inserted through the tab holes 110' of the cell holder 110 and the tab holes 121' of the first connection tabs 121 and exposed on upper surfaces of the first connection tabs 121, and the second connection tabs 122 may be superposed on the upper surfaces of the first connection tabs 121 on which the electrode tabs 10 are exposed. The electrode tabs 10 may be inserted through the tab holes 121' of the first connection tabs 121 and may be bent in directions parallel with the first and second connection tabs 121 and 122 for making surface contact with the first and second connection tabs 121 and 122. The first connection tabs 121, the electrode tabs 10, and the second connection tabs 122 that are superposed on one another may be coupled to each other by welding.

Referring to FIG. 4, the connection tabs 120 may connect first and second battery cells C1 and C2 arranged in a battery cell arrangement direction. For example, electrode tabs 11 and 12 of the first and second battery cells C1 and C2 inserted through different tab holes 121' of the first connection tabs 121 may be bent to face each other and may be brought into contact with the first and second connection tabs 121 and 122. Then, the electrode tabs 11 and 12 may be coupled to the first and second connection tabs 121 and 122 by welding.

As shown in FIG. 6, the electrode tabs 10 of the first and second battery cells C1 and C2 may be disposed between the first and second connection tabs 121 and 122. The electrode tabs 10 of the first and second battery cells C1 and C2 may extend in parallel with the first and second connection tabs 121 and 122, and ends of the electrode tabs 10 may be separated from each other by a predetermined distance. The electrode tabs 10 of the first and second battery cells C1 and C2 may be disposed between the first and second connection tabs 121 and 122 in a state in which the electrode tabs 10 do not overlap each other but keep a predetermined distance from each other. This structure may be employed to limit the number of layers of coupling portions between the electrode tabs 10 and the connection tabs 120 within three, e.g., to be three or less. If the electrode tabs 10 of the first and second battery cells C1 and C2 are disposed between the first and second connection tabs 121 and 122 to overlap each other, the coupling portions between the electrode tabs 10 and the connection tabs 120 may have a four-layer structure. Accordingly, the thickness of the coupling portions may be increased, and it may be difficult to obtain a sufficient degree of coupling strength. Therefore, in an exemplary embodiment, the electrode tabs 10 of the first and second battery cells C1 and C2 may be disposed not to overlap each other so as to limit the number of layers of the coupling portions between the electrode tabs 10 and the connection tabs 120 to three or less.

The connection tabs 120 and the electrode tabs 10 may be coupled to each other by welding. For example, the pair of first and second connection tabs 121 and 122 may be welded together with the electrode tabs 10 being disposed therebetween to obtain a high degree of coupling strength between the electrode tabs 10 and the connection tabs 120 that are formed of different materials.

For example, the connection tabs 120 may connect the electrode tabs 10 of the first and second battery cells C1 and C2, and the connection tabs 120 may connect the first and second electrode tabs 11 and 12 formed of different materials. For example, the first electrode tabs 11 may be formed of copper or nickel, and the second electrode tabs 12 may be formed of aluminum or nickel. The connection tabs 120 may be formed of nickel. For example, the pair of first and second connection tabs 121 and 122 may be formed of the same material such as nickel.

For example, the connection tabs 120 may connect the first and second battery cells C1 and C2 in series, and the connection tabs 120 and the electrode tabs 10 of at least one of the first and second battery cells C1 and C2 may be formed of different materials. For example, the connection tabs 120 may be formed of nickel different from copper used to form the electrode tabs 10. The pair of first and second connection tabs 121 and 122 may be disposed on the lower and upper sides of the electrode tabs 10 formed of copper as so to guarantee a sufficient degree of welding strength between different materials.

The connection tabs 120 may connect the electrode tabs 10 of the first and second battery cells C1 and C2, and the first electrode tabs 11 having the same polarity may be connected to each other, or the second electrode tabs 12 having the same polarity may be connected to each other. The connection tabs 120 may connect the electrode tabs 10 formed of the same material. For example, the connection tabs 120 formed of nickel may connect the first electrode tabs 11 formed of copper.

In an exemplary embodiment, the connection tabs 120 may include the pair of first and second connection tabs 121 and 122 disposed on the lower and upper sides of electrode tabs 10, and welding quality may be improved. However, if the connection tabs 120 has a single structure, for example, the connection tabs 120 include only the first connection tabs 121, the electrode tabs 10 may be exposed on the upper surfaces of the first connection tabs 121, and in this state, welding may be performed. The quality of welding may be decreased according to properties of a material used to form the electrode tabs 10. For example, if the electrode tabs 10 are formed of copper and an electric resistance welding process is performed, the quality of welding may be insufficient because copper has low resistance and rapidly cooling characteristics, and if the electrode tabs 10 are formed of copper and a laser welding process is performed, a large amount of energy may be consumed because of high reflectivity of copper. If the electrode tabs 10 are formed of aluminum, sufficient mechanical strength may not be obtained, and coupling portions with the connection tabs 120 having a single structure may have poor tensile strength.

If the connection tabs 120 have a single structure, back-bead defects may be caused because of concentration of welding energy. For example, welding holes may be formed in a back side of a coupling portion, that difficulties in process management and quality management may be caused. In an exemplary embodiment, the electrode tabs 10 may be disposed between the pair of first and second connection tabs 121 and 122, welding energy may be uniformly distributed, and back-bead defects such as welding holes may be prevented.

The coupling portions between the electrode tabs 10 and the connection tabs 120 may form a charging and discharging current path of the battery cells C through which a charging or discharging current flows. The coupling portions being electric contact points of the battery cells C may be relatively narrow, and the total resistance of the charging and discharging current path may be markedly affected by the coupling portions. If the connection tabs 120 have a single structure, the charging and discharging current path may be restricted as described above, resistance loss may be increased as much as the restriction, and the electric output power of the battery pack may be lowered.

In an exemplary embodiment, the pair of first and second connection tabs 121 and 122 may be disposed on the lower and upper sides of the electrode tabs 10, and the electrode tabs 10 may not be directly exposed, and welding quality deterioration caused by, for example, material properties of the electrode tabs 10, may be prevented. The coupling portions between the electrode tabs 10 and the connection tabs 120 may have an improved degree of mechanical tensile strength and a reduced degree of electric resistance, and overall welding quality may be improved.

The connection tabs 120 and the electrode tabs 10 may be coupled through a laser welding process. The lower and upper sides of the electrode tabs 10 having a relatively thin thickness may be covered with the pair of first and second connection tabs 121 and 122 of the connection tabs 120, and the electrode tabs 10 may be smoothly welded even though a large amount of heat is input during the laser welding process. Welding holes may be formed in the connection tabs 120, and laser welding may be performed through the welding holes.

In an exemplary embodiment, the connection tabs 120 and the electrode tabs 10 may be coupled to each other by welding. In a comparative example, the connection tabs 120 and the electrode tabs 10 may be coupled to each other by soldering. Soldering may be a manual process that may use a large amount of solder, the quality of soldering may be not uniform, and the coupling between the connection tabs 120 and the electrode tabs 10 may be broken at a weak point. Solder may scatter to another conductive part from a coupling portion, and a short circuit may occur. Due to, for example, properties of a material used to form the electrode tabs 10, the electrode tabs 10 may exhibit poor bonding characteristics. For example, the electrode tabs 10 may be formed of an aluminum material, and bonding errors may arise due to, for example, galvanic corrosion. In an exemplary embodiment, welding may be used, process automation may be possible, and coupling quality may be uniformly maintained without electrical connection errors or a short circuit.

A pair of battery cells C may be electrically connected to each other by the connection tabs 120. Poles of the pair of battery cells C having the same polarity or opposite polarities may be electrically connected to each other.

As shown in FIG. 4, poles of a pair of neighboring battery cells C having opposite polarities may be electrically connected to form series connection. The pair of neighboring battery cells C may be oppositely oriented in a left-to-right direction such that first and second electrode tabs 11 and 12 of the battery cells C may be disposed at crossing positions. For example, the first electrode tab 11 of the first battery cell C1 may face the second electrode tab 12 of the second battery cell C2. The first electrode tab 11 of the first battery cell C1 may be connected to the second electrode tab 12 of the second battery cell C2 through a connection tab 120, and the first electrode tab 11 of the second battery cell C2 may be connected to a second electrode tab 12 of a third battery cell C3 through another connection tab 120. Referring to FIG. 7, first and second tab holes 1201' and 1202' may be formed in the connection tabs 120 to receive the electrode tabs 10 of the first and second battery cells C1 and C2 may be located at different distances (d) from sides 120S of the connection tabs 120. The sides 120S may be sides of the connection tabs 120 extending parallel with the arrangement direction of the battery cells C.

Poles of a pair of neighboring battery cells C having the same polarity may be electrically connected to form parallel connection. The pair of neighboring battery cells C may be oriented such that first and second electrode tabs 11 and 12 of the battery cells C may be disposed at left and right sides. For example, the first electrode tab 11 of the first battery cell C1 may face the first electrode tab 11 of the second battery cell C2. The first electrode tab 11 of the first battery cell C1 may be connected to the first electrode tab 11 of the second battery cell C2 through a connection tab 120, and the second electrode tab 12 of the first battery cell C1 may be connected to the second electrode tab 12 of the second battery cell C2 through another connection tab 120. The first and second tab holes 1201' and 1202' formed in the connection tabs 120 to receive the electrode tabs 10 of the first and second battery cells C1 and C2 may be located at the same distance (d) from the sides 120S of the connection tabs 120. The sides 120S may be sides of the connection tabs 120 extending parallel with the arrangement direction of the battery cells C.

As shown in FIG. 2, positive and negative electrode tabs of the battery cells C, for example, the first and second electrode tabs 11 and 12 of the battery cells C may be asymmetric with respect to a centerline CL of the battery cells C. The first and second electrode tabs 11 and 12 may be biased to the left or right with respect to the centerline CL of the battery cells C. In series connection, neighboring battery cells C may be oppositely oriented in the left-to-right direction, and in parallel connection, neighboring battery cells C may not be oppositely oriented in the left-to-right direction. When the battery cells C are connected in series, the tab holes 1201' and 1202' receiving the electrode tabs 10 of the battery cells C may be located at different distances (d) from sides 120S of the first connection tabs 121 in the left-to-right direction, and when the battery cells C are connected in parallel, the tab holes 1201' and 1202' receiving the electrode tabs 10 of the battery cells C may be located at the same distance (d) from the sides 120S of the first connection tabs 121 in the left-to-right direction.

For example, when the battery cells C are connected in series, the battery cells C arranged in the arrangement direction may be oppositely oriented in the left-to-right direction. When the battery pack is manually assembled, the battery cells C may be incorrectly oriented in the left-to-right direction due to, for example, characteristics of a manual assembling process. However, owing to the tab holes 1201' and 1202' of the connection tabs 120, such orientation errors may be prevented. For example, if the battery cells C are identically oriented in the left-to-right direction in a process for connecting the battery cells C in series, the tab holes 1201' and 1202' of the first connection tabs 121 and the electrode tabs 10 of the battery cells C may not be aligned, and a worker may detect an orientation error.

In an exemplary embodiment, the output power of the battery pack may be increased by increasing the number of battery cells C. For example, the battery pack may be expanded by repeatedly arranging unit packs each being a group of battery cells C.

Figure 8:
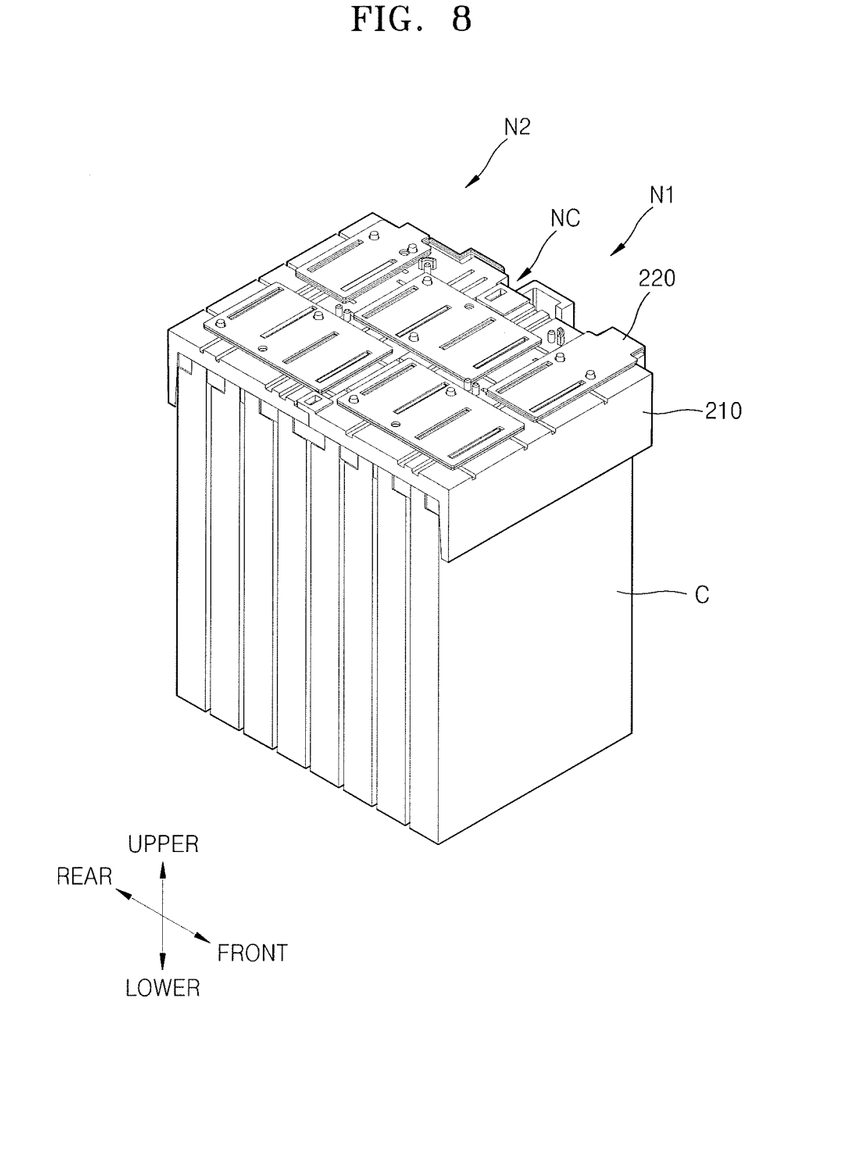
FIG. 8 illustrates a view of a battery pack according to an exemplary embodiment.
Figure 9:
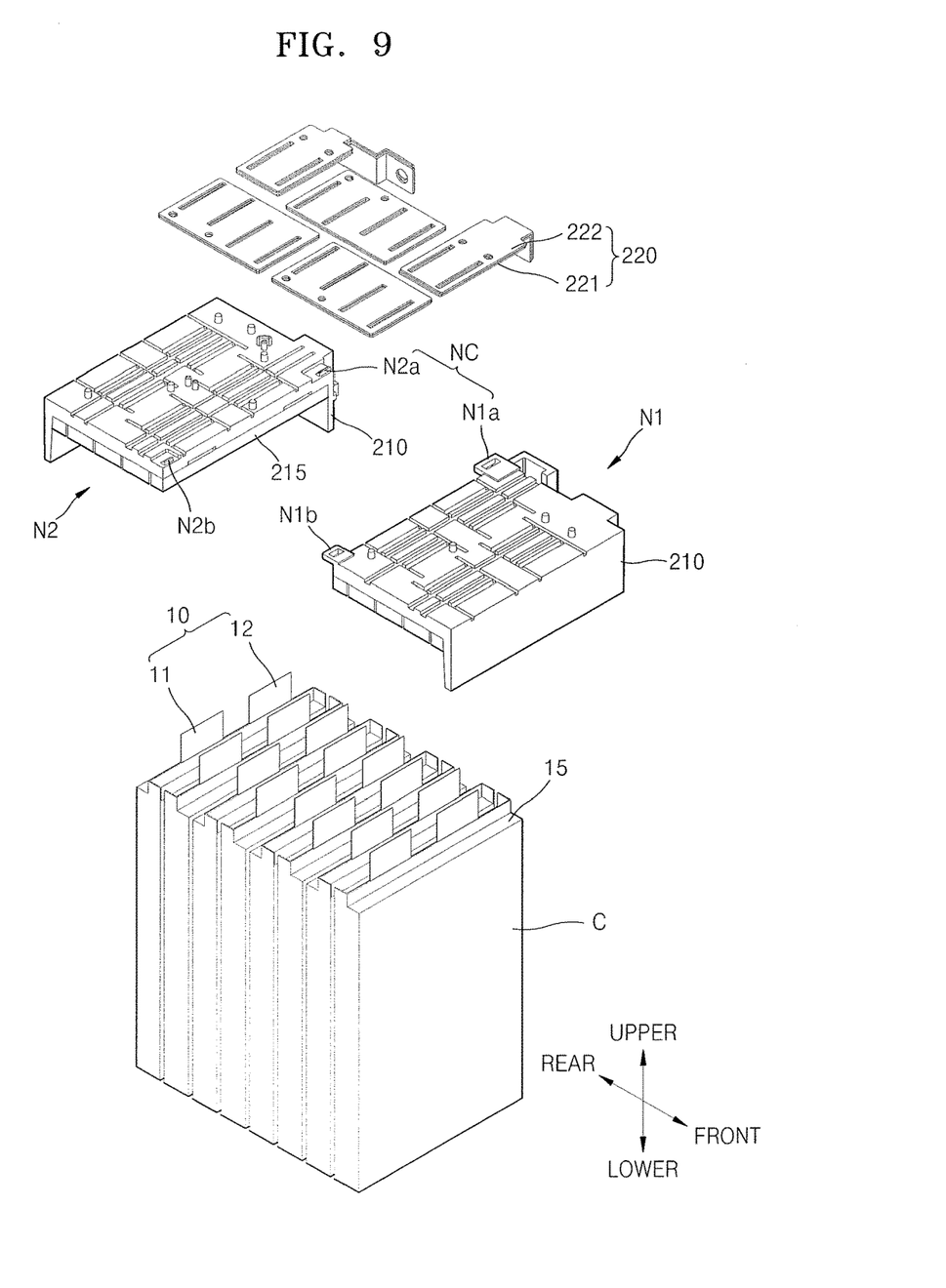

FIG. 8 illustrates a view of a battery pack according to an exemplary embodiment. FIG. 9 illustrates an exploded perspective view of the battery pack depicted in FIG. 8.

Referring to FIG. 8, the battery pack may include a first unit pack N1 and a second unit pack N2 coupled to each other. As described later, the battery pack may be constituted by only one of the first and second unit packs NI and N2 or by coupling the first and second unit packs Ni and N2 according to a required output power or capacity level. As described later, the first and second unit packs N1 and N2 may have substantially the same structure.

In an exemplary embodiment, the first and second unit packs N1 and N2 having substantially the same structure may be connected together to double the output power or capacity of the battery pack. The first and second unit packs N1 and N2 may have substantially the same structure, and various performance requirements may be flexibly handled. For example, the battery pack may be constituted by a single unit pack such as the first unit pack N1 or the second unit pack N2 for applications requiring relatively low power levels or may be constituted by connecting the first and second unit packs Ni and N2 for applications requiring relatively high power levels. The battery pack may be constituted according to power requirements by one or more unit packs having substantially the same structure, the efficiency of processes for manufacturing the battery pack may be increased, and it may not be necessary to invest in designs and production equipment for producing battery packs having different structures and output power levels.

In an exemplary embodiment, the first and second unit packs N1 and N2 may have substantially the same structure. The expression "substantially the same structure" means that although the first and second unit packs N1 and N2 do not have completely the same structure, and the first and second unit packs N1 and N2 have almost identical structures. For example, the designs of the first and second unit packs N1 and N2 may be identical except for some parts such as expansion connection parts NC (described later).

Referring to FIG. 9, cell holders 210 may include expansion connection parts NC. The expansion connection parts NC may be used to connect the first and second unit packs Ni and N2. The expansion connection parts NC may be formed on edge portions or outer portions of the cell holders 210, and the expansion connection parts NC of the first and second unit packs N1 and N2 may be coupled to each other. For example, the cell holder 210 of the first unit pack N1 may include expansion connection parts N1a and N1b for coupling with the cell holder 210 of the second unit pack N2, and the cell holder 210 of the second unit pack N2 may include expansion connection parts N2a and N2b for coupling with the cell holder 210 of the first unit pack N1.

Referring to FIG. 9, the cell holders 210 may include support ribs 215 protruding downward from the cell holders 210 for supporting terraces 15 of battery cells C. The support ribs 215 may be brought into direct contact with the terraces 15 of the battery cells C. Connection tabs 220 for electrically connecting the battery cells C may include first and second connection tabs 221 and 222. The first and second connection tabs 221 and 222 may be disposed on lower and upper sides of electrode tabs 10 of the battery cells C so that the electrode tabs 10 may be sandwiched between the first and second connection tabs 221 and 222.

In an exemplary embodiment, the battery cells C neighboring each other may be connected in series, parallel, or series-parallel. The electrical connection configuration of the battery cells C may be varied according to electrical output power requirements.

Figure 10:
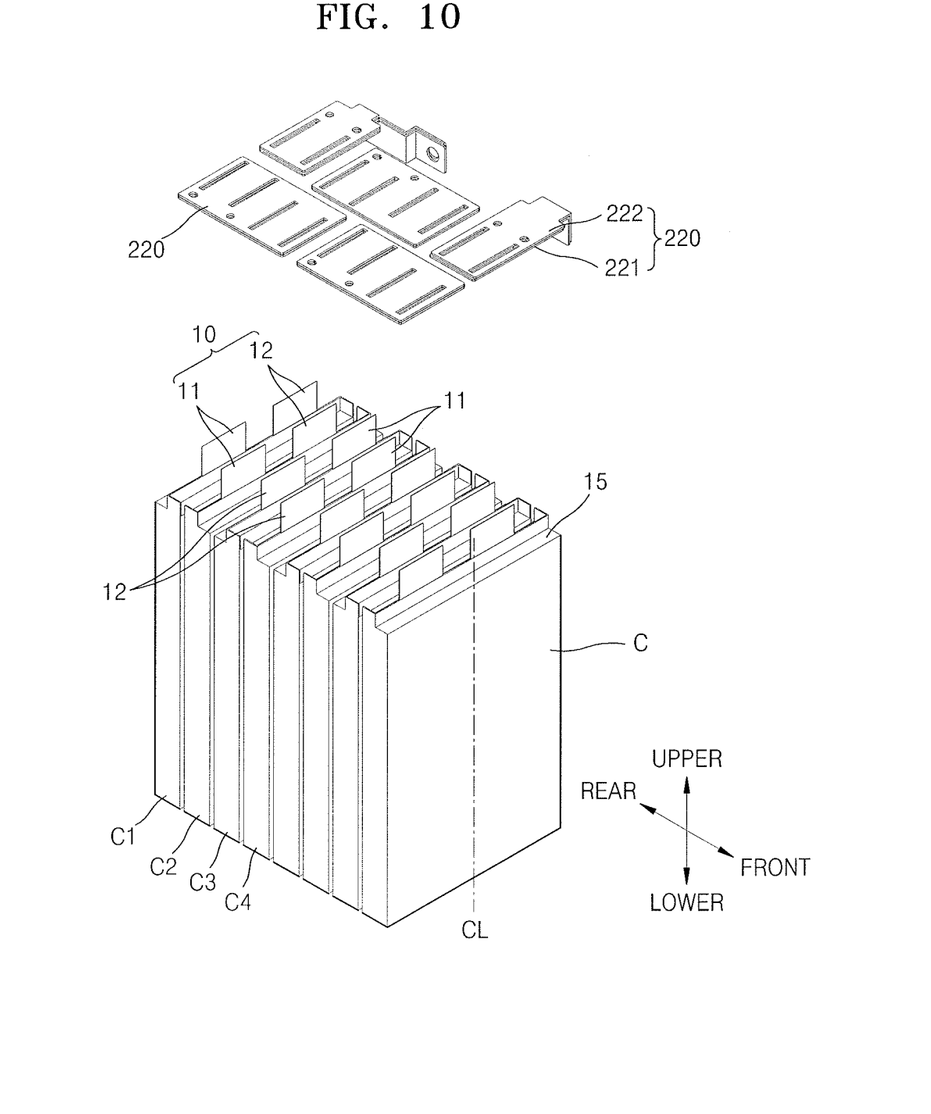
FIGS. 10 and 11 illustrate a perspective view and a plan view of a connection structure of a battery pack according to an exemplary embodiment.
Figure 11:
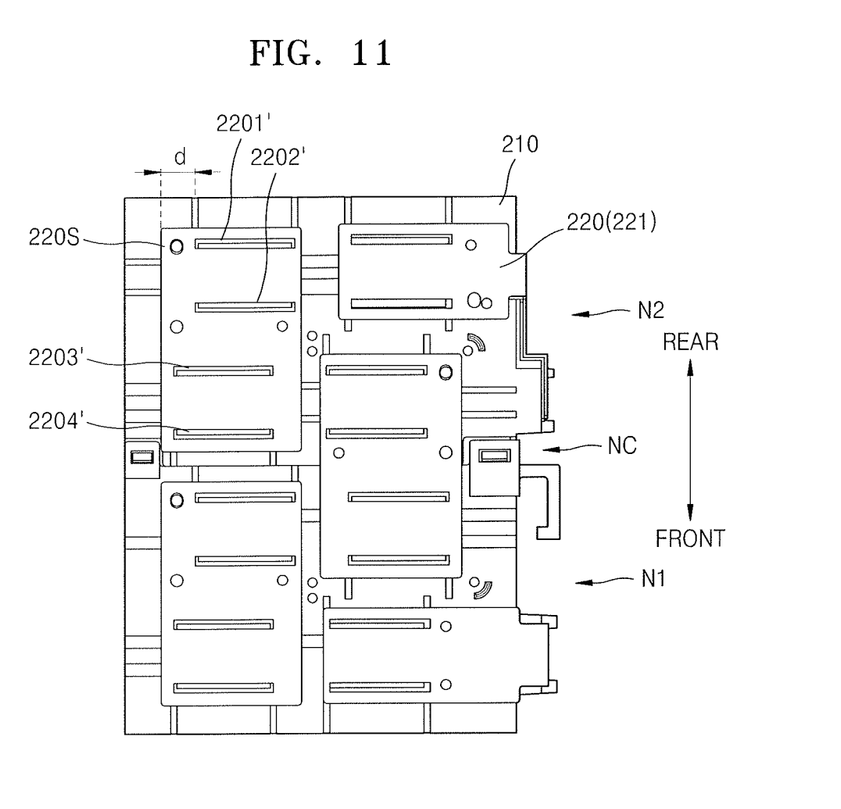

FIGS. 10 and 11 illustrate a perspective view and a plan view of a connection structure of a battery pack according to an exemplary embodiment.

In an exemplary embodiment shown in FIG. 10, battery cells may be connected in series-parallel. For example, a pair of first and second battery cells C1 and C2 neighboring each other in an arrangement direction of the battery cells C may be connected in such a manner that poles having the same polarity may be connected to each other (parallel connection), and a pair of third and fourth battery cells C3 and C4 may be connected in such a manner that poles having the same polarity may be connected to each other (parallel connection). Then, the pair of first and second battery cells C1 and C2 may be connected in series to the pair of third and fourth battery cells C3 and C4 such that poles having different polarities may be connected to each other (series connection). For example, in the arrangement direction of the battery cells C, the battery cells C may be oppositely oriented in a left-to-right direction. One of the connection tabs 220 may connect a first electrode tab 11 of the first battery cell C1 to a first electrode tab 11 of the second battery cell C2 to connect the pair of first and second battery cells C1 and C2 in parallel, and may connect a second electrode tab 12 of the third battery cell C3 to a second electrode tab 12 of the fourth battery cell C4 for connecting the pair of third and fourth battery cells C3 and C4 in parallel. The connection tab 220 may connect the first electrode tabs 11 of the pair of first and second battery cells C1 and C2 in series to the second electrode tabs 12 of the pair of third and fourth battery cells C3 and C4.

In series-parallel connection shown in FIG. 11, one of the connection tabs 220 may include first to fourth tab holes 2201', 2202', 2203', and 2204' for receiving the electrode tabs 11 and 12 of the first to fourth battery cells C1, C2, C3, and C4. The connection tab 220 may connect the pair of first and second battery cells C1 and C2 in parallel and may connect the pair of third and fourth battery cells C3 and C4 in parallel. The pair of first and second battery cells C1 and C2 may be connected in series to the pair of third and fourth battery cells C3 and C4. The first and second tab holes 2201' and 2202' may be formed at the same distance (d) from a side 220S of a first connection tab 221, and the third and fourth tab holes 2203' and 2204' may be formed at the same distance (d) from the side 220S of the first connection tab 221. The first tab hole 2201' and the third tab holes 2203' may be formed at different distances (d) from the side 220S of the first connection tab 221. The side 120S may be a side of the first connection tab 221 extending parallel with the arrangement direction of the battery cells C.

As shown in FIG. 10, positive and negative electrode tabs of the battery cells C, for example, the first and second electrode tabs 11 and 12 of the battery cells C may be asymmetric with respect to a centerline CL of the battery cells C. The first and second electrode tabs 11 and 12 may be biased to the left or right with respect to the centerline CL of the battery cells C. In series connection, neighboring battery cells C may be oppositely oriented in the left-to-right direction, and in parallel connection, neighboring battery cells C may not be oppositely disposed in the left-to-right direction. The tab holes 2201' and 2202' and the tab holes 2203' and 2204' for receiving electrode tabs 10 of the battery cells C connected in series may be located at different distances (d) from the side 220S of the first connection tab 221 in the left-to-right direction, and the tab holes 2201' and 2202' or the tab holes 2203' and 2204' for receiving the electrode tabs 10 of the battery cells C connected in parallel may be located at the same distance (d) from the side 220S of the first connection tab 221 in the left-to-right direction.

For example, in series-parallel connection, orientations of the battery cells C in the left-to-right direction may be identical and opposite in turns in the arrangement direction of the battery cells C. When the battery pack is manually assembled, the battery cells C may be incorrectly oriented in the left-to-right direction due to, for example, characteristics of a manual assembling process. However, owing to tab holes 2201', 2202', 2203', and 2204' of the connection tabs 220, such orientation errors may be prevented. For example, if battery cells C are identically oriented in the left-to-right direction in a process for connecting the battery cells C in series, the tab holes 2201', 2202', 2203', and 2204' of the connection tabs 220 and the electrode tabs 10 of the battery cells C may not be aligned, and a worker may detect an orientation error.

By way of summation and review, one or more exemplary embodiments include a battery pack in which a plurality of battery cells may be connected using a connection tab for improving the coupling strength between the battery cells.

As described above, according to the one or more of the above exemplary embodiments, the coupling structure between connection tabs and battery cells may be improved, workability in a coupling process such as a welding process may be improved, and a battery pack having an improved degree of coupling strength may be provided.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery pack, comprising:
   a plurality of battery cells, each battery cell of the plurality of battery cells including an electrode tab;
   a cell holder through which the electrode tab of each battery cell is inserted; and
   a connection tab coupled to electrode tabs of at least a first battery cell and a second battery cell neighboring each other in an arrangement direction of the battery cell, the connection tab including a first connection tab portion and a second connection tab portion facing each other, both the first connection tab portion and the second connection tab portion being electrically coupled to the electrode tabs of at least the first battery cell and the second battery cell with the electrode tabs being therebetween, wherein,
   the first connection tab portion and the second connection tab portion are in a form of parallel plates,
   the first connection tab portion includes tab holes,
   the electrode tabs extend through respective ones of the tab holes,
   end portions of the electrode tabs extended through the tab holes are bent in a direction towards each other parallel to the first connection tab portion and parallel to the second connection tab portion, the end portions of the electrode tabs not overlapping each other, and
   the second connection tab portion covers the end portions of the electrode tabs extended through the tab hole, such that the end portions of the electrode tabs are in surface contact with the first and second tab connection portions.

2. The battery pack as claimed in claim 1, wherein the electrode tab and the connection tab are coupled together by welding.

3. The battery pack as claimed in claim 1, wherein a cross-section of a coupling portion between the electrode tabs and the connection tab has a maximum of three layers including the first and second connection tab portions and the electrode tab of the first or second battery cell.

4. The battery pack as claimed in claim 1, wherein the connection tab includes a material different from a material included in the electrode tab of at least one of the first and second battery cells.

5. The battery pack as claimed in claim 4, wherein the electrode tabs of the first and second battery cells include different materials.

6. The battery pack as claimed in claim 4, wherein the first and second connection tab portions include a same material.

7. The battery pack as claimed in claim 1, wherein:
   the tab holes of the first connection tab portion include first and second tab holes through which the electrode tabs of the first and second battery cells extend, and
   a distance between the first tab hole and a side of the first connection tab portion is equal to a distance between the second tab hole and the side of the first connection tab portion.

8. The battery pack as claimed in claim 7, wherein the side of the first connection tab portion extends in a direction parallel to the arrangement direction of the battery cells.

9. The battery pack as claimed in claim 1, wherein:
   the tab holes of the first connection tab portion include first and second tab holes through which the electrode tabs of the first and second battery cells extend, and
   a distance between the first tab hole and a side of the first connection tab portion is different from a distance between the second tab hole and the side of the first connection tab portion.

10. The battery pack as claimed in claim 1, wherein:
    the tab holes of the first connection tab portion include first to fourth tab holes through which electrode tabs of first to fourth battery cells extend, and
    a distance between the first tab hole and a side of the first connection tab portion is equal to a distance between the second tab hole and the side of the first connection tab portion, a distance between the third tab hole and the side of the first connection tab portion is equal to a distance between the fourth tab hole and the side of the first connection tab portion, and the distance between the first tab hole and the side of the first connection tab portion is different from the distance between the third tab hole and the side of the first connection tab portion.

* * * * *